Figure 8:
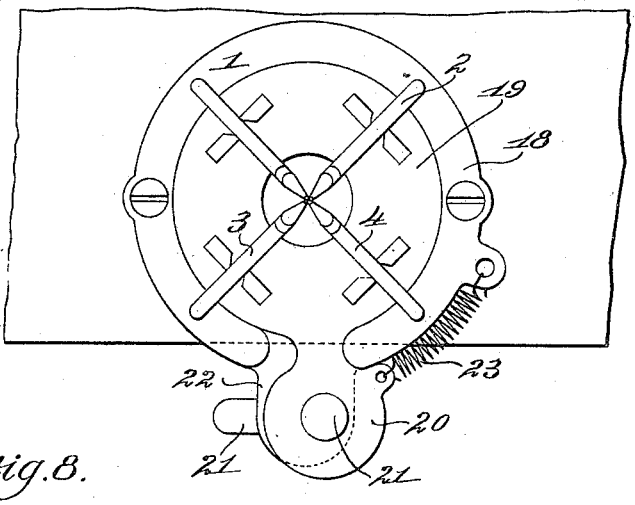

No. 680,870. Patented Aug. 20, 1901.
F. LEU.
DEVICE FOR ATTACHING RUBBER WASHERS TO BOTTLE STOPPERS.
(Application filed June 3, 1901.)
(No Model.) 2 Sheets—Sheet 1.
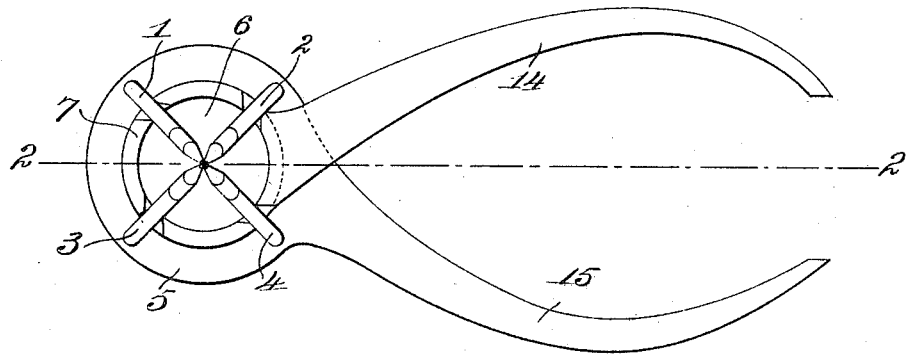
Fig.1.
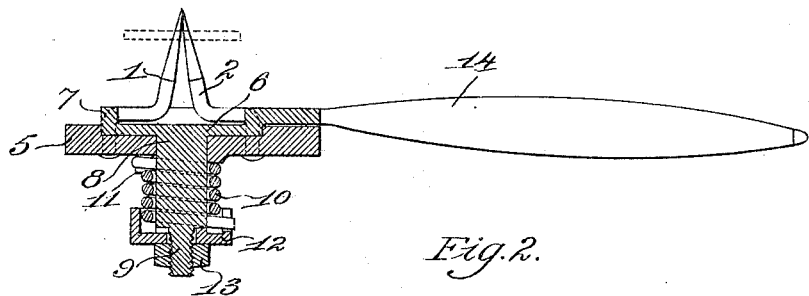
Fig.2.
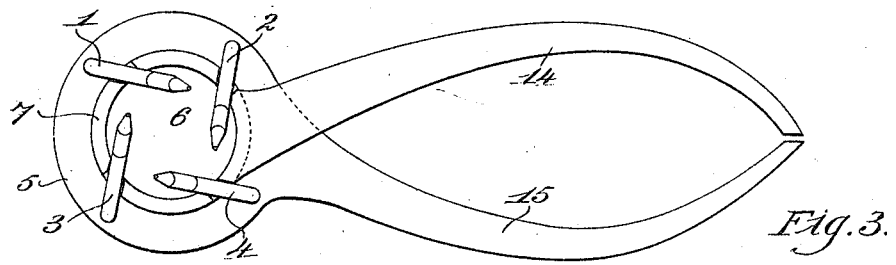
Fig.3.
Fig.4.
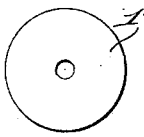
Fig.5.
Fig.6. Fig.7.
Witnesses
Edward S. Day
Fred O. Fish
Inventor
Frederick Leu
by his Attorney
Benjamin Phillips
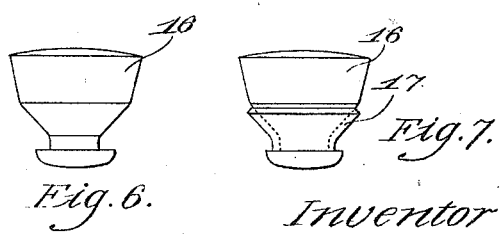

No. 680,870. Patented Aug. 20, 1901.
F. LEU.
DEVICE FOR ATTACHING RUBBER WASHERS TO BOTTLE STOPPERS.
(Application filed June 3, 1901.)
(No Model.) 2 Sheets—Sheet 2.

Witnesses
Edward S Day
Fred O. Fish

Inventor
Frederick Leu
by his Attorney
Benjamin Phillips

UNITED STATES PATENT OFFICE.

FREDERICK LEU, OF COLLEGEPOINT, NEW YORK, ASSIGNOR TO MAX C. ROSENFELD, OF BOSTON, MASSACHUSETTS.

DEVICE FOR ATTACHING RUBBER WASHERS TO BOTTLE-STOPPERS.

SPECIFICATION forming part of Letters Patent No. 680,870, dated August 20, 1901.

Application filed June 3, 1901. Serial No. 62,986. (No model.)

*To all whom it may concern:*

Be it known that I, FREDERICK LEU, a citizen of the United States, residing at Collegepoint, in the county of Queens and State of New York, have invented certain new and useful Improvements in Devices for Attaching Rubber Washers to Bottle-Stoppers; and I do hereby declare the following to be a full, clear, and exact description of the invention, such as will enable others skilled in the art to which it appertains to make and use the same.

The present invention relates to an improved device for attaching rubber washers to bottle-stoppers.

The object of the invention is to provide a simple and efficient means for engaging a rubber washer and stretching it sufficiently to enable it to be readily slipped onto a bottle-stopper.

With this object in view, my invention consists in the devices and combinations of devices hereinafter described and claimed, the advantages of which will be obvious to those skilled in the art.

In carrying out my invention I provide a plurality of stretching members which are arranged to enter the hole in the washer and to be actuated to stretch the washer. These stretching members are mounted upon a suitable support or base and preferably a sufficient number are provided, so that the washer will be stretched in a plurality of directions when the members are actuated to cause the hole in the washer to assume a shape which will enable the washer to be slipped onto the bottle-stopper. The means which I prefer to employ for actuating the stretching members to stretch the washer consists of a cam rotatably mounted on the base which supports the stretching members and engaging said members so as to actuate them to stretch the washer when the cam is rotated. In the embodiment of my invention illustrated in the drawings and hereinafter specifically described the stretching members are pivotally mounted at their outer ends in the base and extend inward toward a common center. The inner ends of said members are disposed at an angle to the main portions and are arranged substantially parallel with their pivots. The cam for actuating the stretching members consists of a disk rotatably mounted on the base, provided with a flange in which are formed openings through which the stretching members pass, the arrangement being such that when the disk is rotated in one direction the inner ends of the stretching members are brought together in a position to enter the hole in the washer and when rotated in the opposite direction the inner ends of the stretching members are separated.

The features of invention above referred to are embodied in the best form at present known to me in the devices illustrated in the accompanying drawings, in which—

Figure 9:
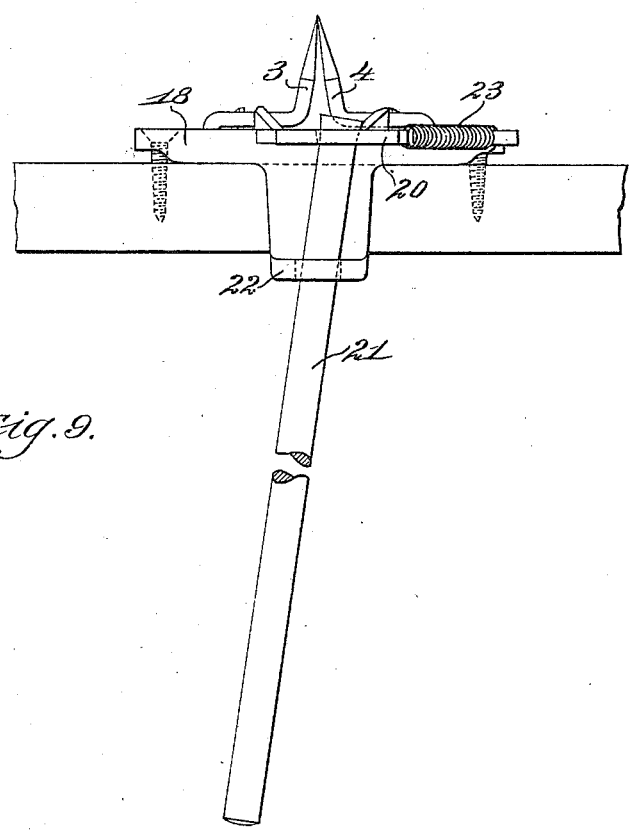

Figure 1 is a plan view of a hand-tool embodying my invention. Fig. 2 is a sectional view on the line 2 2, Fig. 1. Fig. 3 is a plan view similar to Fig. 1 with the stretching members in the position in which they assume after having been actuated to stretch a washer. Fig. 4 is an edge view, and Fig. 5 is a plan view, of a washer. Fig. 6 is a view of a bottle-stopper, and Fig. 7 is a view of the stopper shown in Fig. 6 with the washer applied thereto. Fig. 8 is a plan view of a machine embodying my invention in a slightly-modified form, and Fig. 9 is a view in side elevation of the machine shown in Fig. 8.

Referring to Figs. 1, 2, and 3, the stretching members are indicated at 1, 2, 3, and 4 and consist of wires pivotally mounted at their outer ends upon a base-plate 5. The stretching members extend inward toward a common center, and their inner ends are bent upward at an angle to the base 5, so as to be nearly parallel with the pivots of the members. The upwardly-extending inner ends of the stretching members are pointed and when the parts are in the position shown in Figs. 1 and 2 are close together, so as to enter the hole in the rubber washer, as indicated in Fig. 2. Rotatably mounted in the base 5 is a cam 6, which, as shown in Figs. 1, 2, and 3, consists of a disk provided with an upturned flange 7, which is provided with openings through which the stretching members 1, 2, 3, and 4 pass. From the disk 6 a stud 8 extends through the base 5 and at its lower end is provided with a screw-threaded portion 9. A coiled spring 10 surrounds the stud 8 and has its upper end secured to a pin 11 on the base 5 and its lower end secured to a flanged washer 12, which is held in position on the stud 8 by means of a nut 13 engaging a screw-threaded portion 9 of the stud. The spring tends to rotate the stud 8 and disk 6 in a direction to bring the inner ends of the stretching members together. By rotating the flanged washer 12 on the stud 8 and locking it in adjusted position by means of the nut 13 the tension of the spring can be adjusted. The flanged disk 6 and base 5 are provided with operating-handles 14 and 15, which extend into a position to be grasped by the hand of the operator, the arrangement being such that when the handles are pressed together the disk 6 is rotated against the tension of the spring 10 in a direction to separate the inner ends of the stretching members and bring them into the position shown in Fig. 3.

The operation of the devices above described may be briefly described as follows: The washer is placed over the upwardly-projecting ends of the stretching members, as shown in Fig. 2, and the handles 14 and 15 are pressed together, thereby rotating the flanged disk 6 and swinging the stretching members into the position shown in Fig. 3. The inner ends of the stretching members are thus separated to stretch the washer sufficiently to receive the bottle-stopper, which is inserted into the washer while held by the stretching members, after which the washer is slipped onto the stopper and the handles 14 and 15 released.

A well-known form of bottle-stopper 16 is illustrated in Fig. 6 and the washer 17, which is applied thereto, in Figs. 4 and 5. The appearance of the stopper after the washer has been applied thereto is illustrated in Fig. 7.

From the above description it will be seen that by means of a device embodying my invention rubber washers may be readily applied to bottle-stoppers of this type. It will be apparent, however, that a device embodying my invention may be used to advantage in attaching washers to other forms of stoppers.

In Figs. 8 and 9 is illustrated a machine which embodies my invention in a slightly-modified form. In these figures the base 18 of the device is secured to a table. The stretching members 1, 2, 3, and 4 are of the same shape and are preferably mounted in the same manner as the stretching members of the devices illustrated in Figs. 1, 2, and 3. The cam which actuates the stretching members consists of a circular plate or disk 19, mounted in a circular recess in the base, and is provided on its upper surface with projections, between which the stretching members pass. The disk 19 is provided with an arm 20, which extends through the opening formed in the side of the base 18. The disk is actuated in a direction to separate the inner ends of the stretching members by means of a rod 21, which extends through an opening in the arm 20 of the disk and through an opening in a bracket 22, depending from the base, the lower end of the rod extending into a position to be pressed upon by the knee of the operator. The cam-disk is actuated in the opposite direction to bring the inner ends of the stretching members together by means of a spiral spring 23, one end of which is attached to the base 18 and the other end to the arm 20.

The operation of the machine above described will be obvious from the description heretofore given of the device illustrated in Figs. 1, 2, and 3.

Having thus indicated the nature and scope of my invention and having described a construction embodying the preferred form thereof, I claim as new and desire to secure by Letters Patent—

1. A device for attaching rubber washers to bottle-stoppers, having, in combination, a plurality of stretching members pivoted at their outer ends and having their inner ends arranged substantially parallel with their pivots, in position to enter the hole in the washer and means for swinging said members on their pivots to stretch the washer, substantially as described.

2. A device for attaching rubber washers to bottle-stoppers, having, in combination, a base, a plurality of stretching members pivoted at their outer ends to said base and extending inward toward a common center, the inner ends of said members being disposed at an angle to the main portions and arranged to enter the hole in the washer, a cam rotatably mounted on said base engaging the stretching members and means for rotating the cam to swing said members on their pivots to stretch the washer, substantially as described.

3. A device for attaching rubber washers to bottle-stoppers, having, in combination, a base, a plurality of stretching members mounted thereon, a cam rotatably mounted on said base engaging the stretching members, and means for rotating the cam to actuate said members to stretch the washer, substantially as described.

4. A hand-tool for attaching rubber washers to bottle-stoppers, having, in combination, a base, a plurality of stretching members mounted thereon, a cam rotatably mounted on said base engaging the stretching members and handles projecting from said base and cam arranged to be grasped by the hand of an operator, substantially as described.

In testimony whereof I affix my signature in presence of two witnesses.

FREDERICK LEU.

Witnesses:
G. H. OLDRING,
HENRY J. OLDRING.